US008330581B2

(12) United States Patent
Akiyama et al.

(10) Patent No.: US 8,330,581 B2
(45) Date of Patent: *Dec. 11, 2012

(54) IC TAG, METHOD OF CONTROLLING THE IC TAG, AND IC TAG SYSTEM

(75) Inventors: Kazuhiro Akiyama, Kanagawa (JP);
Hatsuhide Igarashi, Kanagawa (JP);
Seiichi Okamoto, Kanagawa (JP);
Toshiyuki Miyashita, Kanagawa (JP);
Kazumi Seki, Kanagawa (JP); Tatsuya Uchino, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/442,257

(22) Filed: Apr. 9, 2012

(65) Prior Publication Data

US 2012/0194321 A1    Aug. 2, 2012

Related U.S. Application Data

(63) Continuation of application No. 11/526,626, filed on Sep. 26, 2006, now Pat. No. 8,174,365.

(30) Foreign Application Priority Data

Sep. 27, 2005   (JP) ................................ 2005-280998

(51) Int. Cl.
*H04Q 5/22* (2006.01)
(52) U.S. Cl. ................... 340/10.2; 340/10.1; 340/572.1
(58) Field of Classification Search .............. 340/10.1, 340/10.2, 10.3, 10.31, 10.32, 10.33, 10.34, 340/10.4, 10.41, 10.42, 10.5, 572.1, 572.3
See application file for complete search history.

(56) References Cited

U.S. PATENT DOCUMENTS

| 5,266,925 | A  | 11/1993 | Vercellotti et al. |
| 5,698,837 | A  | 12/1997 | Furuta |
| 5,856,788 | A  | 1/1999  | Walter et al. |
| 6,265,962 | B1 | 7/2001  | Black et al. |
| 6,337,619 | B1 | 1/2002  | Kowalski et al. |
| 6,388,562 | B1 | 5/2002  | Takiguchi et al. |
| 6,480,101 | B1 | 11/2002 | Kelly et al. |
| 6,661,336 | B1 | 12/2003 | Atkins et al. |
| 6,707,376 | B1 | 3/2004  | Patterson et al. |
| 6,724,297 | B1 | 4/2004  | Vacherand et al. |
| 6,725,014 | B1 | 4/2004  | Voegele |
| 7,019,664 | B2 | 3/2006  | Turner et al. |
| 7,119,664 | B2 | 10/2006 | Roesner |
| 7,274,284 | B2 | 9/2007  | Dressen |
| 7,284,703 | B2 | 10/2007 | Powell et al. |
| 7,336,154 | B2 | 2/2008  | Friedrich |

(Continued)

FOREIGN PATENT DOCUMENTS

EP    0924635 (A2)    6/1999

(Continued)

*Primary Examiner* — Nabil Syed
(74) *Attorney, Agent, or Firm* — Foley & Lardner LLP

(57) ABSTRACT

To provide an IC tag, a method of controlling the IC tag, and an IC tag system which can reduce a communication sequence between the reader/writer and the IC tag and can shorten a communication period or a period necessary for executing the command. According to an embodiment of the invention, an IC tag that executes a command processing based on a command received from a redder/writer, includes: a command analyzing unit determining an execution condition of the command received from the redder/writer; and a command execution unit executing a first command processing if the execution condition is met, and executing a second command processing different from the first command processing if the execution condition is not met.

7 Claims, 9 Drawing Sheets

U.S. PATENT DOCUMENTS

| | | |
|---|---|---|
| 7,365,633 B2 | 4/2008 | Inoue et al. |
| 7,429,912 B2 | 9/2008 | Tanaka et al. |
| 7,486,172 B2 | 2/2009 | Martinez et al. |
| 7,545,256 B2 | 6/2009 | O'Toole et al. |
| 2004/0066281 A1 | 4/2004 | Hughes et al. |
| 2004/0145454 A1 | 7/2004 | Powell et al. |
| 2005/0083178 A1 | 4/2005 | Friedrich |
| 2005/0231327 A1 | 10/2005 | Friedrich et al. |
| 2005/0237159 A1 | 10/2005 | Cooper et al. |
| 2006/0017544 A1 | 1/2006 | Tanaka et al. |
| 2006/0077039 A1 | 4/2006 | Ibi et al. |
| 2006/0114104 A1 | 6/2006 | Scaramozzino |
| 2006/0152342 A1 | 7/2006 | Turner et al. |
| 2006/0214772 A1 | 9/2006 | Hsieh et al. |
| 2006/0232383 A1 | 10/2006 | Yoon et al. |
| 2006/0232384 A1 | 10/2006 | Yang |
| 2007/0001812 A1 | 1/2007 | Powell |
| 2007/0057774 A1 | 3/2007 | Kawamata |
| 2007/0069862 A1 | 3/2007 | Mo et al. |
| 2007/0085661 A1 | 4/2007 | Yamazoe et al. |
| 2007/0139162 A1 | 6/2007 | Bandy et al. |
| 2007/0159305 A1 | 7/2007 | Cesar et al. |
| 2007/0176746 A1 | 8/2007 | Lee et al. |
| 2007/0200677 A1 | 8/2007 | Murano |
| 2007/0236332 A1 | 10/2007 | Quan et al. |
| 2007/0236335 A1 | 10/2007 | Aiouaz et al. |
| 2008/0018431 A1 | 1/2008 | Turner et al. |
| 2008/0068131 A1 | 3/2008 | Cargonja et al. |
| 2008/0068133 A1 | 3/2008 | Hashimoto et al. |
| 2008/0191844 A1 | 8/2008 | Allen et al. |
| 2008/0211638 A1 | 9/2008 | Masui et al. |
| 2009/0015382 A1 | 1/2009 | Greefkes |
| 2009/0058613 A1 | 3/2009 | Chung et al. |
| 2009/0096585 A1 | 4/2009 | Herrod et al. |
| 2009/0115582 A1 | 5/2009 | Kim |
| 2009/0134975 A1 | 5/2009 | Eom et al. |

FOREIGN PATENT DOCUMENTS

| | | |
|---|---|---|
| JP | 8-123919 (A) | 5/1996 |
| JP | 11-266177 (A) | 9/1999 |
| JP | 2000-48136 (A) | 2/2000 |
| JP | 2000-513841 (A) | 10/2000 |
| JP | 2004-38574 A | 2/2004 |
| JP | 2005-157850 (A) | 6/2005 |

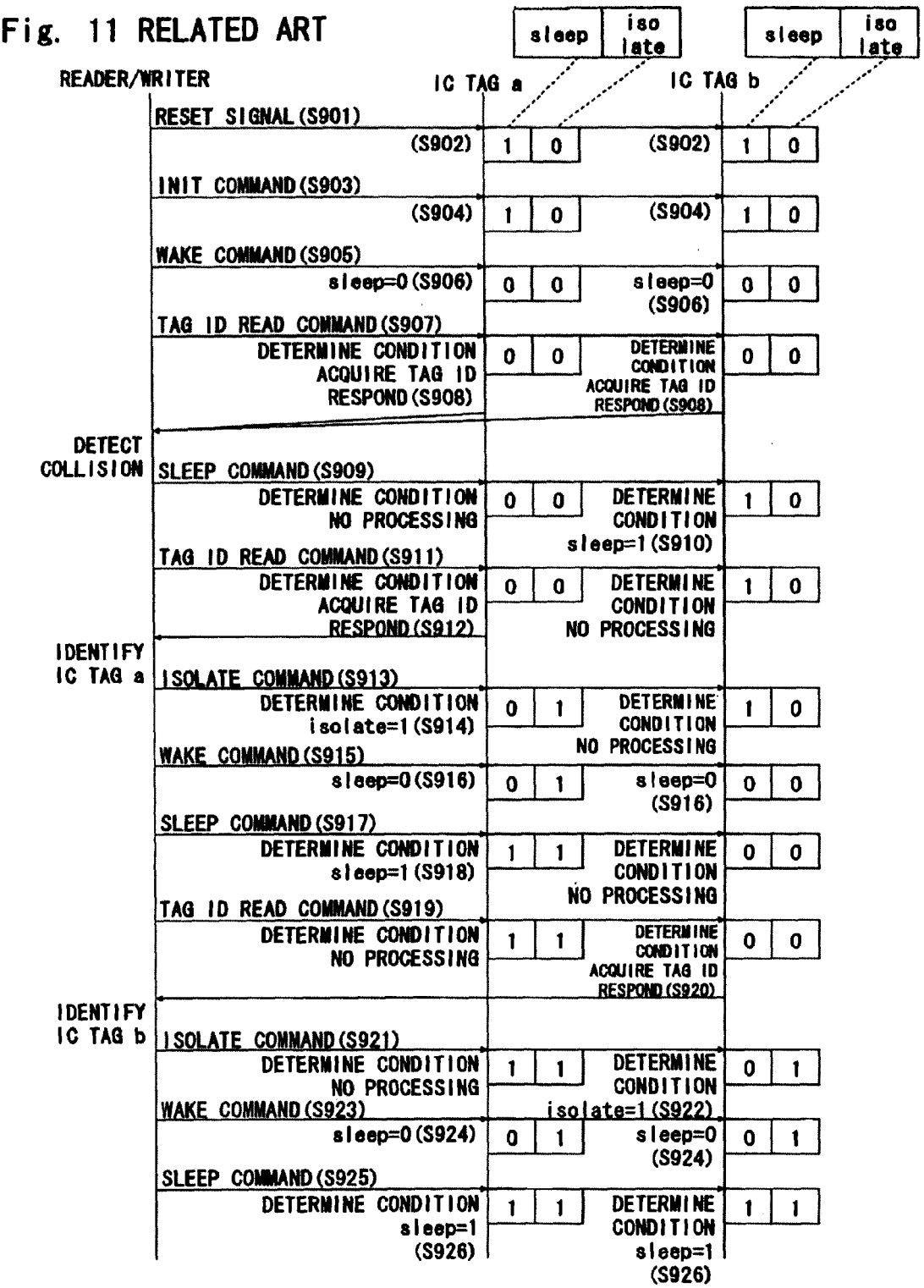

IC TAG, METHOD OF CONTROLLING THE IC TAG, AND IC TAG SYSTEM

CROSS-REFERENCE TO RELATED PATENT APPLICATIONS

Japan Priority Application 2005-280998, filed Sep. 27, 2005 including the specification, drawings, claims and abstract, is incorporated herein by reference in its entirety. This application is a Continuation of U.S. application Ser. No. 11/526,626, filed Sep. 26, 2006, incorporated herein by reference in its entirety.

BACKGROUND OF THE INVENTION

1. Field of the Invention

The present invention relates to an IC tag, a method of controlling the IC tag, and an IC tag system. In particular, the invention relates to an IC tag which communicates with a reader/writer by radio, a method of controlling the IC tag, and an IC tag system.

2. Description of Related Art

In recent years, attentions have been paid to a technique regarding RFID (Radio Frequency IDentification) as a product automatic identifying technique for affixing an IC tag having product specific information written thereto, and scanning this information using a radio antenna to manage a product in real time, in merchandise logistics management at the factory and article management at a retail shop. The RFID is advantageous in that data can be read from plural tags at a time or data stored in a tag can be rewritten unlike a barcode.

The above RFID IC tag (hereinafter simply referred to as "IC tag") communicates with a reader/writer by radio to write/read data to/from a non-volatile memory in the IC tag. The IC tag communicates with the reader/writer while transmitting/receiving radio waves or data in accordance with a predetermined communication protocol.

Further, the RFID adopts a technique called "anti-collision" for communications between a reader/writer and plural IC tags. In the REID, data communication is carried out in such a way that the IC tag responds back to radio waves transmitted from the reader/writer. Thus, if plural IC tags exist within a communicable range of the reader/writer, the plural IC tags simultaneously transmit signals to the reader/writer. As a result, the signals of the plural tags overlap with each other in time, and the reader/writer cannot receive a desired signal. Such phenomenon is referred to as "signal collision." The anti-collision is a technique of preventing the collision and identifying each IC tag to execute communications. In order to identify an IC tag, a tag ID (identification information unique to an IC tag) for uniquely identifying an IC tag called a "unique ID" is stored in an IC tag.

For the anti-collision or accesses to a memory of an IC tag, a tag ID read command to read a tag ID from an IC tag, a read command to read data stored in the IC tag, and a write command to write data to the IC tag are utilized. Assuming that the IC tag executes a command, a reader/write sends command data representing a command to be executed toward the IC tag. Then, the IC tag sends response data as a response showing the result of executing the command, toward the reader/writer.

FIG. 8 shows a format of command data sent from the reader/writer to the IC tag. As shown in FIG. 8, the command data includes a command ID field 801 and a data field 802. The command ID field 801 stores a command ID (command identifier) to be executed by the IC tag. The data field 802 stores parameters necessary for executing a command. Examples of the command parameters include a tag ID of an IC tag intended to execute a command, a read address, a write address, and write data. Incidentally, the data field 802 can be omitted depending on a command to be executed. Receiving the command data, the IC tag analyzes the command data to execute a command in accordance with parameters of the data field.

Further, the IC tag has plural internal states (communication states), and operates while shifting the state in accordance with the command execution. For example, the internal state of the IC tag is held by an internal flag of the IC tag. The internal flag is, for example, a sleep flag or an isolate flag. The sleep flag indicates a SLEEP state that the operation of the IC tag is temporarily suspended. The isolate flag indicates an ISOLATED state that the reader/writer identifies a tag ID.

Each state is changed in response to a reset signal or command sent from the reader/writer. Examples of the command that shifts the state of the IC tag include a SLEEP command to put the IC tag into the SLEEP state, a WAKE command to cancel the SLEEP state of the IC tag, and an ISOLATE command to bring the IC tag into an ISOLATED state. For example, when receiving the SLEEP command, the IC tag sets a sleep flag to set the internal state to the SLEEP state. When receiving the ISOLATE command, the IC tag sets the isolate flag to set the internal state to the ISOLATED state.

When receiving command data, the IC tag executes a requisite operation in accordance with command parameters or the IC tag internal state. That is, the IC tag includes a condition determining circuit, and this circuit determines an execution condition for executing a command. If the execution condition is met, the IC tag executes a command. Commands that can be executed if the execution command is met are called "condition-matched command."

Flowcharts of FIGS. 9 and 10 show a command receiving processing in a conventional IC tag. FIG. 9 shows an operation of the IC tag in the case of receiving a tag ID read command, and FIG. 10 shows an operation of the IC tag in the case of receiving a SLEEP command.

As shown in FIG. 9, when receiving a tag ID read command (S801), the IC tag determines whether or not a sleep flag held therein is 0 (S802). If the determination result shows that the sleep flag is 0, that is, if the SLEEP state is cancelled, a tag ID read processing is executed (S803). On the other hand, if the sleep flag is not 0, that is, if the IC tag is in the SLEEP state, a processing of changing a state or the like is not carried out and a current state is kept.

As shown in FIG. 10, when receiving the SLEEP command (S811), the IC tag references command parameters to determine whether or not a tag ID held therein is included within a designated tag ID area (S812). If the determination result shows that the tag ID is included, the sleep flag is set to 1 to put the tag into the SLEEP state (S813). On the other hand, if the tag ID is not included, a processing of changing a state or the like is not carried out and a current state is kept.

FIG. 11 is a sequence chart of a communication method of a conventional IC tag system. This sequence is such that a reader/writer communicates with IC tags a and b within a communication area to identify tag IDs of the IC tags a and b through anti-collision.

First, the reader/writer sends a reset signal to the IC tags a and b in order to reset the internal state of the IC tags within a communication area (S901), and the IC tags a and b sets the sleep flag to 1 and sets the isolate flag to 0 to thereby set the internal state to the SLEEP state (S902). Subsequently, the reader/writer sends an INIT command to the IC tags a and b within the communication area (S903), and the IC tags a and b are initialized (S904).

Next, the reader/writer executes an anti-collision processing from step S905 onward. First, the reader/writer sends a WAKE command to the IC tags a and b (S905). Then, the IC tags a and b reset the sleep flag to 0, and the SLEEP state as the internal state is cancelled (S906). Next, the reader/writer sends a tag ID read command to the IC tags a and b (S907). Then, the IC tags a and b determines whether or not sleep flag=0 as shown in FIG. 9 to retrieve a tag ID held therein and send the tag ID to the reader/writer as a response to the command (S908).

Next, the reader/writer detects a collision of the received tag ID to send the SLEEP command to the IC tags a and b (S909). As a parameter of the SLEEP command, a tag ID range is set as a condition for an IC tag the internal state of which is the SLEEP state. Then, as shown in FIG. 10, it is determined whether or not tag IDs of the IC tags a and b fall within the tag ID range designated by the command parameter. As a result, the tag ID of the IC tag a is out of the range, so a command processing thereof is not executed. On the other hand, the tag ID of the IC tag b falls within the range, so the sleep flag is set to 1 to put the IC tag into the SLEEP state (S910). Next, the reader/writer sends the tag ID read command to the IC tags a and b (S911). Then, as shown in FIG. 9, the IC tags a and b determined whether or not sleep flag=0. As a result, sleep flag=1 for the IC tag b, so the processing thereof is not executed. On the other hand, sleep flag=0 for the IC tag a, so a tag ID held therein is retrieved, and the tag ID is sent to the reader/writer as a response to the command (S912).

Next, since there is no fear about the collision of the tag ID, the reader/writer identifies the tag ID of the IC tag a to send the ISOLATE command to the IC tags a and b (S913). Then, the IC tags a and b determined whether or not sleep flag=0. As a result, sleep flag=1 for the IC tag b, so the processing thereof is not executed. On the other hand, sleep flag=0 for the IC tag a, the isolate flag is set to 1 to put the tag into the ISOLATED state (S914).

Next, the reader/writer sends the WAKE command to the IC tags a and b (S915). Then, the IC tags a and b reset the sleep flag to 0 to cancel the SLEEP state as the internal state (S916). Next, the reader/writer sends the SLEEP command to the IC tags a and b (S917). As a parameter of the SLEEP command, "isolate flag=1" is set as a condition for an IC tag the internal state of which is the SLEEP state. Then, the IC tags a and b determine whether or not isolate flag=1. As a result, isolate flag=0 for the IC tag b, so the processing thereof is not executed. On the other hand, isolate flag=1 for the IC tag a, so the sleep flag is set to 1 to bring the IC tag into the SLEEP state (S918). Next, the reader/writer sends the tag ID read command to the IC tags a and b (S919). Then, as shown in FIG. 9, the IC tags a and b determined whether or not sleep flag=0. As a result, sleep flag=1 for the IC tag a, so the processing thereof is not executed. On the other hand, sleep flag=0 for the IC tag b, so a tag ID held therein is retrieved, and the tag ID is sent to the reader/writer as a response to the command (S920).

Next, since there is no fear about the collision of the tag ID, the reader/writer identifies a tag ID of the IC tag b to send the ISOLATE command to the IC tags a and b (S921). At that time, the IC tags a and b determine whether or not sleep flag=0. As a result, sleep flag=1 for the IC tag a, so the processing thereof is not executed. On the other hand, sleep flag=0 for the IC tag b, so the isolate flag is set to 1 to bring the tag into the ISOLATED state (S922). Next, the reader/writer sends the WAKE command to the IC tags a and b (S923). Then, the IC tags a and b reset the sleep flag to 0 to cancel the SLEEP state as the internal state (S924). Next, the reader/writer sends the SLEEP command to the IC tags a and b (S925). As a parameter of the SLEEP command, "isolate flag=1" is set as a condition for an IC tag the internal state of which is the SLEEP state. Then, the IC tags a and b determined whether or not isolate flag=1. As a result, isolate flag=1 for the IC tags a and b, so the sleep flag is set to 1 to bring the tag into the SLEEP state (S926). Through the aforementioned steps, the anti-collision processing is completed. The read command or write command is sent to the IC tags a and b, and data is written to/read from a memory of the IC tags a and b.

Incidentally, one disclosed in Japanese Unexamined Patent Application Publication No. 2004-38574 has been known as a conventional IC card system. In the system of Japanese Unexamined Patent Application Publication No. 2004-38574, only an IC card that satisfies the execution condition responds back to the reader/writer, as shown in FIGS. 9 and 10.

As described above, in the conventional IC tag system, the anti-collision processing requires transmission/reception of much command data or response data until the tag ID of the IC tag is identified, and thus the processing takes much time to execute. This problem is more serious as the number of IC tags increases.

Considering an example of applying the RFID to a physical distribution system, products have been distributed in large quantity in recent years, so the number of products (IC tags) to be identified/processed by the reader/writer during one processing is increased. Further, in the case of identifying/processing tags in a conveyor system such as a belt conveyor system, a conveying speed itself of the belt conveyor becomes higher. In this way, there is an increasing demand to process more products at higher speeds. To that end, it is important to increase a tag identifying/processing speed of the reader/writer.

SUMMARY OF THE INVENTION

According to an aspect of the invention, an IC tag that executes a command processing based on a received command, includes: an execution condition determination unit determining an execution condition of the received command; and a command execution unit executing a first command processing if the execution condition is met, and executing a second command processing different from the first command processing if the execution condition is not met. According to the IC tag, in response to one command sent from the reader/writer, two IC tags can execute different processings. Hence, a communication sequence between the reader/writer and the IC tag can be reduced, and a communication period or a period necessary for executing the command can be shortened.

According to another aspect of the invention, a method of controlling an IC tag for executing a command processing based on a received command, includes: determining an execution condition of the received command with the IC tag; and executing a first command processing with the IC tag if the execution condition is met, and executing a second command processing different from the first command processing with the IC tag if the execution condition is not met. According to the method of controlling an IC tag, in response to one command sent from the reader/writer, two IC tags can execute different processings. Hence, a communication sequence between the reader/writer and the IC tag can be reduced, and a communication period or a period necessary for executing the command can be shortened.

According to another aspect of the invention, an IC tag system includes: a reader/writer; and an IC tag executing a command processing based on a command received from the reader/writer, the IC tag including: an execution condition determination unit determining an execution condition of the command received from the reader/writer; and a command execution unit executing a first command processing if the execution condition is met, and executing a second command processing different from the first command processing if the execution condition is not met. According to the IC tag system, in response to one command sent from the reader/writer, two IC tags can execute different processings. Hence, a communication sequence between the reader/writer and the IC tag can be reduced, and a communication period or a period necessary for executing the command can be shortened.

According to the present invention, it is possible to provide an IC tag, a method of controlling the IC tag, and an IC tag system which can reduce a communication sequence between the reader/writer and the IC tag and can shorten a communication period or a period necessary for executing the command.

BRIEF DESCRIPTION OF THE DRAWINGS

The above and other objects, advantages and features of the present invention will be more apparent from the following description taken in conjunction with the accompanying drawings, in which:

FIG. 11 is a sequence chart of a communication method of a conventional IC tag system.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

First Embodiment

First, an IC tag system according to a first embodiment of the present invention is described. A feature of the IC tag system of this embodiment is that an IC tag receiving a predetermined command executes a first operation if its internal state matches an execution condition of the command, and executes a second operation different from the first operation if the internal state does not match the execution condition. In particular, in this embodiment, if the execution condition is met, a processing of setting the internal state to the SLEEP state is executed. If the execution condition is not met, a tag ID read processing is executed.

Figure 1:
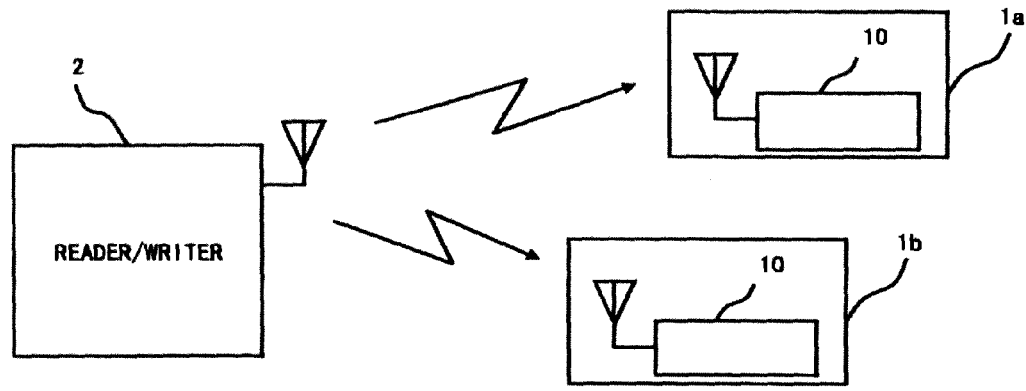
FIG. 1 is a diagram of an IC tag system according to a first embodiment of the present invention.

Referring now to FIG. 1, a configuration of the IC tag system of this embodiment is described. As shown in FIG. 1, the IC tag system includes an IC tag 1 and a reader/writer 2. The IC tag system is a communication system in which the IC tag 1 communicates with the reader/writer 2 by radio in accordance with a predetermined communication protocol.

In the IC tag system, the plural IC tags 1 are provided. One reader/writer 2 can communicate with the plural IC tags 1 based on the anti-collision function. In this example, one reader/writer 2 and two IC tags 1 of the IC tags 1a and 1b are provided. Each of the IC tags 1 includes a semiconductor device 10 as described below.

The reader/writer 2 is communicably connected with, for example, a computer (not shown). In accordance with an instruction from the computer, predetermined data is written to a storage circuit in the IC tag 1, or data written to the storage circuit of the IC tag 1 is read.

For example, in the case of writing/reading data to/from the IC tag 1, if a distance between the reader/writer 2 and the IC tag 1 reduces, the IC tag 1 receives radio waves from the reader/writer 2 to rectify the radio waves to generate a power supply voltage. The reader/writer 2 sends a command from the computer to the IC tag 1, and the IC tag 1 receives the command to write/read data to/from the storage circuit in the IC tag 1.

Figure 2:
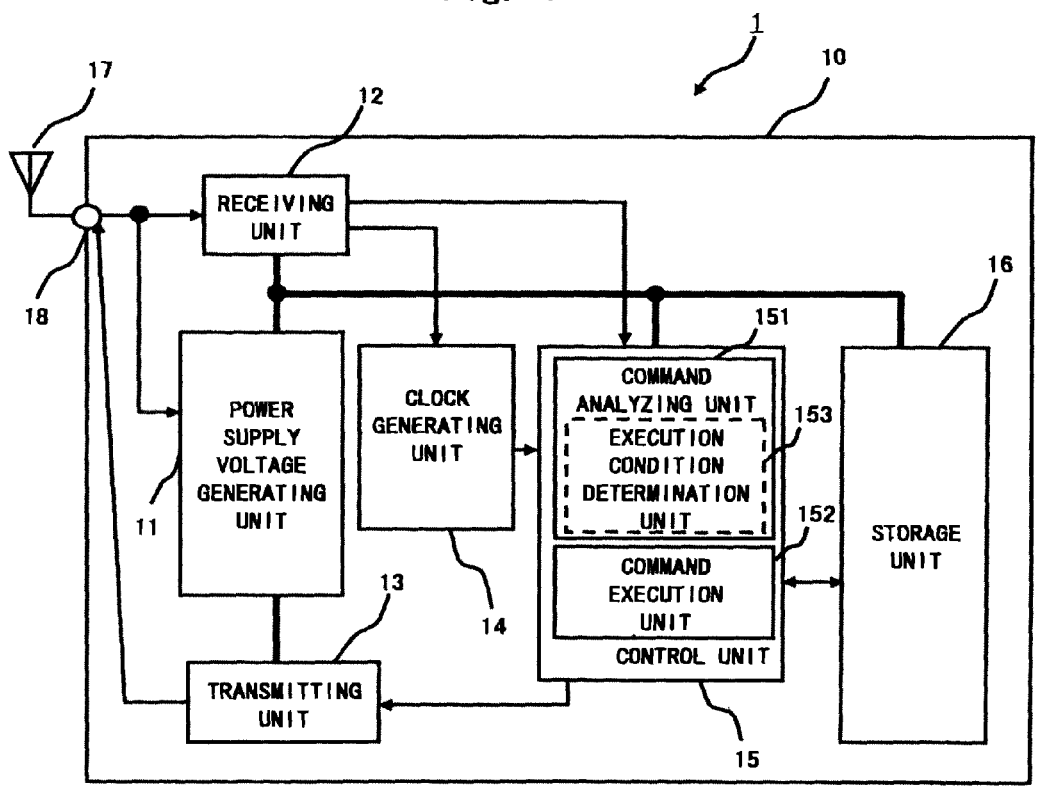
FIG. 2 is a block diagram of the configuration of an IC tag of the first embodiment.

Referring next to FIG. 2, a configuration of the IC tag of this embodiment is described. As shown in FIG. 2, the IC tag 1 includes a semiconductor device 10 and an antenna 17. The semiconductor device 10 and the antenna 17 are connected together through an antenna terminal 18. Further, the semiconductor device 10 includes a power supply voltage generating unit 11, a receiving unit 12, a transmitting unit 13, a clock generating unit 14, a control unit 15, and a storage unit 16.

The antenna 17 transmits/receives radio waves to/from the reader/writer 2 and has characteristics adequate for frequencies of radio waves transmitted from the reader/writer 2. The power supply voltage generating unit 11 rectifies the radio waves received by the antenna 17 to generate a power supply voltage in accordance with the amplitude of the radio waves. The power supply voltage is supplied to the receiving unit 12, the transmitting unit 13, the clock generating unit 14, the control unit 15, the storage unit 16, or the like.

The receiving unit 12 demodulates the radio waves received by the antenna 17 and converts the waves into a demodulated signal. The demodulated signal is output to the clock generating unit 14 or the control unit 15. The transmitting unit 13 modulates a data signal including data generated and sent by the control unit 15, and converts the signal into a modulated signal. The modulated signal is sent to the reader/writer 2 in the form of radio waves through the antenna 17.

The clock generating unit 14 extracts a frame pulse of a predetermined period from the demodulated signal generated by the receiving unit 12 to generate a clock signal based on the frame pulse. The clock signal is output to the control unit 15 or the like.

The storage unit 16 is a memory for storing data received from the reader/writer 2, for example, a non-volatile memory. The storage unit 16 stores data or outputs stored data under the control of the control unit 15. The storage unit 16 may be, as the non-volatile memory, an EEPROM (Electrically Erasable Programmable ROM) or flash memory, a FeRAM (Ferroelectric RAM), MRAM (Magnetic RAM), an OUM (Ovonic Unified Memory), or the like. Further, the storage unit 16 includes a step-up circuit such as a charge pump. Upon writing data, the step-up circuit boosts the power supply voltage up to a voltage level necessary for data writing.

In response to a write command, data is written to the storage unit 16. In response to a read command, written data is read from the storage unit 16. The storage unit 16 also stores a tag ID or internal state. Incidentally, in order to increase a processing speed, the tag ID or internal state may be stored in a register in the control unit 15.

The control unit 15 decodes the demodulated signal generated by the receiving unit 12 to extract and analyze a command, and write/read data to/from the storage unit 16 in accordance with the command. The control unit 15 includes a command analyzing unit 151 for analyzing a received command and a command execution unit 152 for executing the analyzed command. When receiving a predetermined command, the control unit 15 determines whether or not an execution condition of the command is met, by means of the command analyzing unit 151 and the command execution unit 152, and changes a processing to be executed between the case where the condition is met and the case where the condition is not met.

The command analyzing unit 151 analyzes a format of the received command data to acquire detailed information of the command ID field and the data field in the command data. Further, the command analyzing unit 151 includes an execution condition determination unit 153 determining an execution condition of a command in the command ID field in order to execute the command. Examples of the execution condition includes an internal state of the IC tag or a tag ID designated by a command parameter.

The command execution unit 152 executes the command analyzed by the command analyzing unit 151. Based on the determination result from the command analyzing unit 151, the command execution unit 152 executes a first command processing if the execution condition is met, and executes a second command processing different from the first command processing if the execution condition is not met. For example, if the execution condition is a condition regarding an internal state, the command execution unit 152 executes the first command processing if a current internal state of the IC tag matches the execution condition of the received command, and executes the second command processing if a current internal state of the IC tag does not match the execution condition of the received command. In addition, if the execution condition is a condition regarding a tag ID, the command execution unit 152 executes the first command processing if a tag ID of the IC tag matches a tag ID designated by the received command, and executes the second command processing if a tag ID of the IC tag does not match a tag ID designated by the received command.

For example, if the command analyzed with the command analyzing unit 151 is a write command, the command execution unit 152 writes data to the storage unit 16 to send a response message that the command processing is completed, from the transmitting unit 13. Further, if the command analyzed with the command analyzing unit 151 is a read command or tag ID read command, the command execution unit 152 reads data or tag ID from the storage unit 16 to send the read data from the transmitting unit 13.

Figure 8:
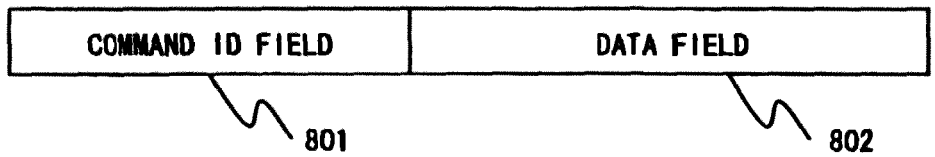
FIG. 8 shows a format of command data used in the IC tag system.
Figure 9:
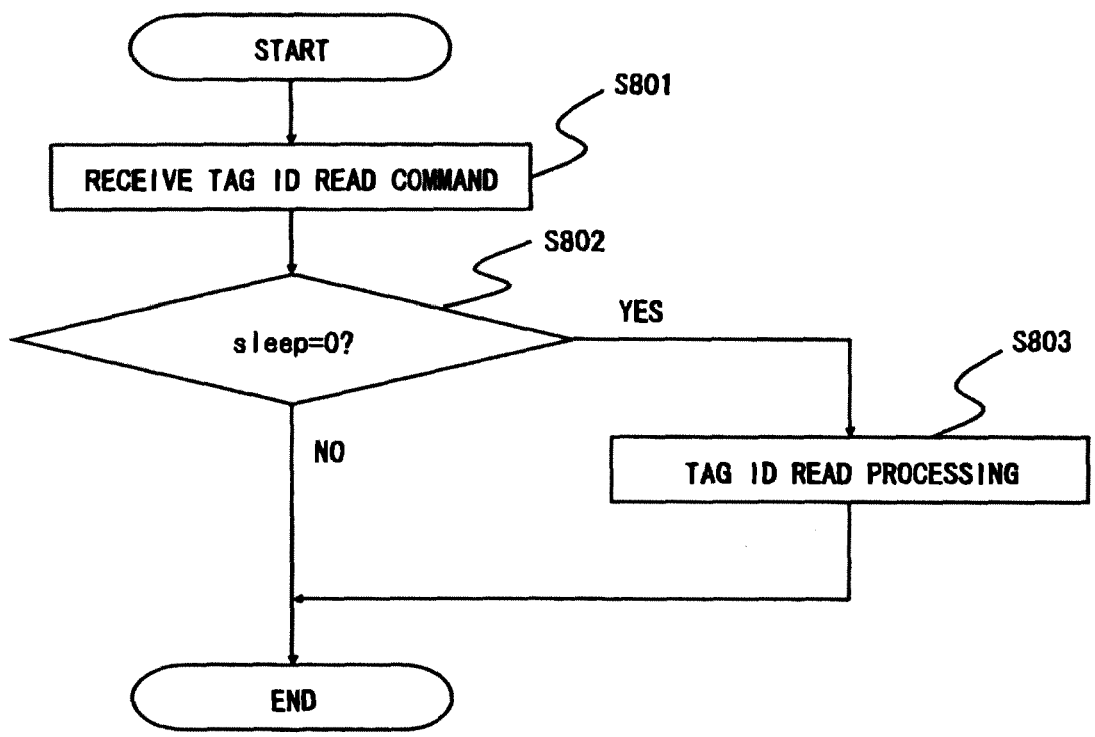
FIG. 9 is a flowchart of a command execution processing of a conventional IC tag.
Figure 10:
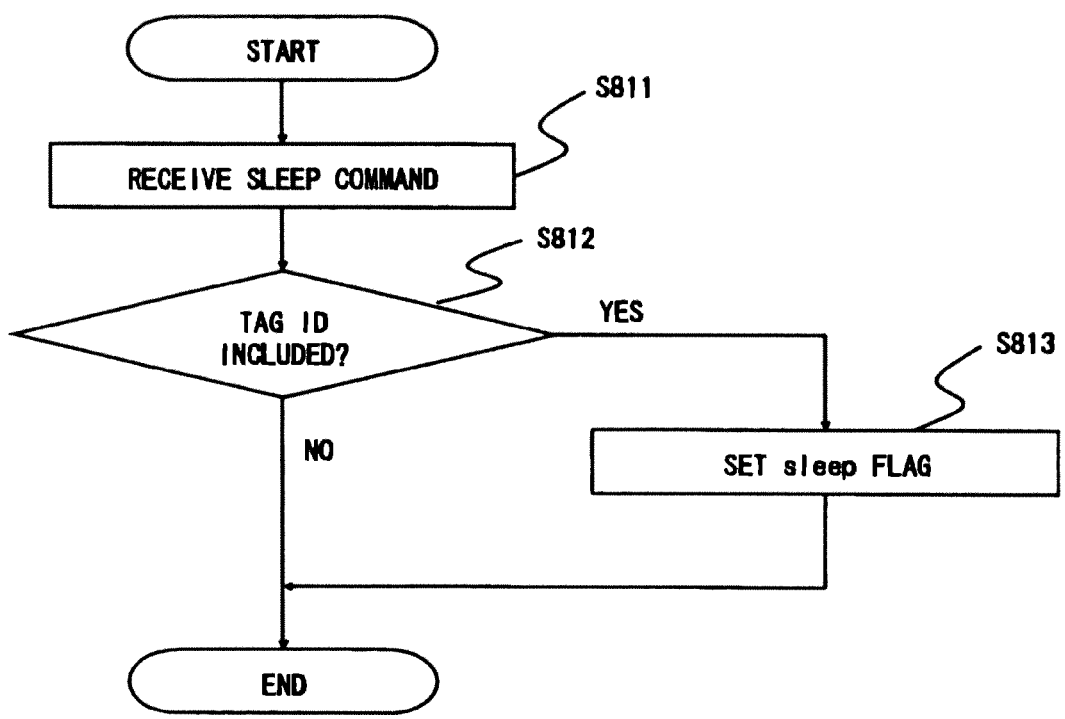
FIG. 10 is a flowchart of the command execution processing of the conventional IC tag.

Furthermore, in this embodiment, the tag ID read/SLEEP command is analyzed/executed. The tag ID read/SLEEP command is a command to instruct the IC tag to execute a tag ID read processing for reading a tag ID or a SLEEP processing for switching the internal state into a SLEEP state. For example, the tag ID read/SLEEP command is sent from the reader/writer in accordance with a format of FIG. 8, an identifier of the tag ID read/SLEEP command is set in command ID field, and a tag ID of the IC tag the internal state of which is the SLEEP state is set in the data field.

Figure 3:
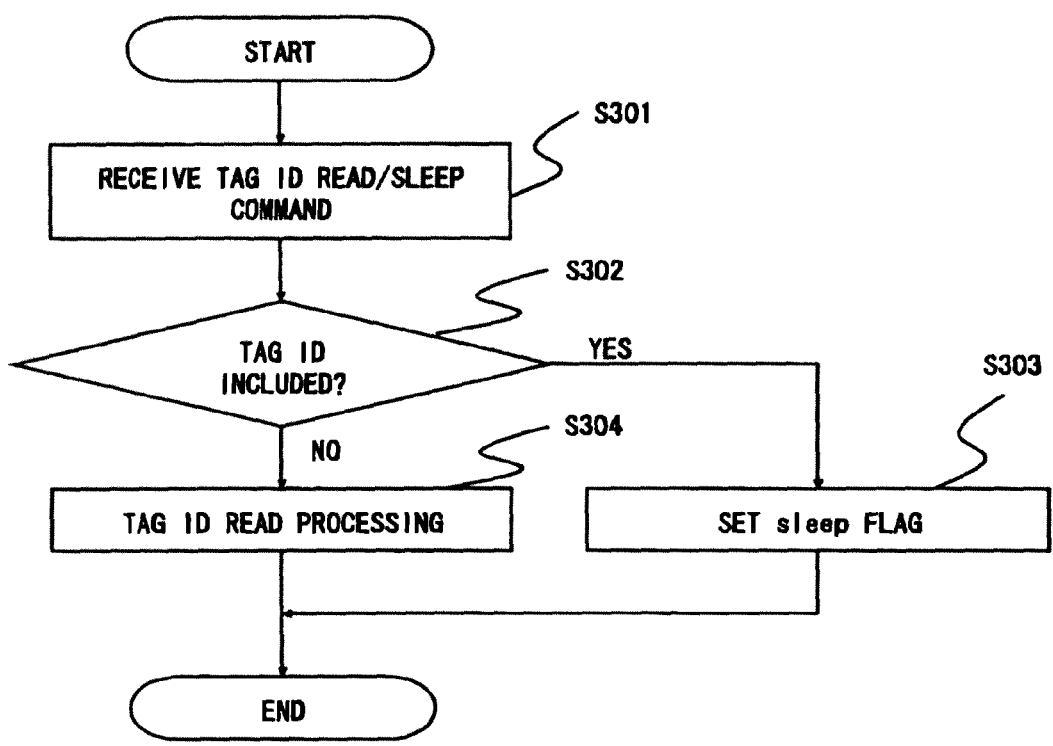
FIG. 3 is a flowchart of a command execution processing of the IC tag of the first embodiment.

A flowchart of FIG. 3 shows a processing of the IC tag in the case where the IC tag receives the tag ID read/SLEEP command.

First, the command analyzing unit 151 analyzes the received command data to detect that the received command is a tag ID read/SLEEP command based on a command ID of the command ID field (S301).

Next, the command analyzing unit 151 compares a tag ID range of a parameter in the data field with a tag ID stored in the storage unit 16 to determine whether or not the tag ID of the IC tag falls within the tag ID range designated by the command (S302).

In step S302, if the determination result shows that the tag ID is included, the command execution unit 152 sets the sleep flag to 1 to bring the tag into the SLEEP state (S303). Further, in step S302, if the determination result shows that the tag ID is not included, the command execution unit 152 executes the tag ID read processing (S304). In the tag ID read processing, a tag ID is retrieved from the storage unit 16 and sent from the transmitting unit 13.

Figure 4:
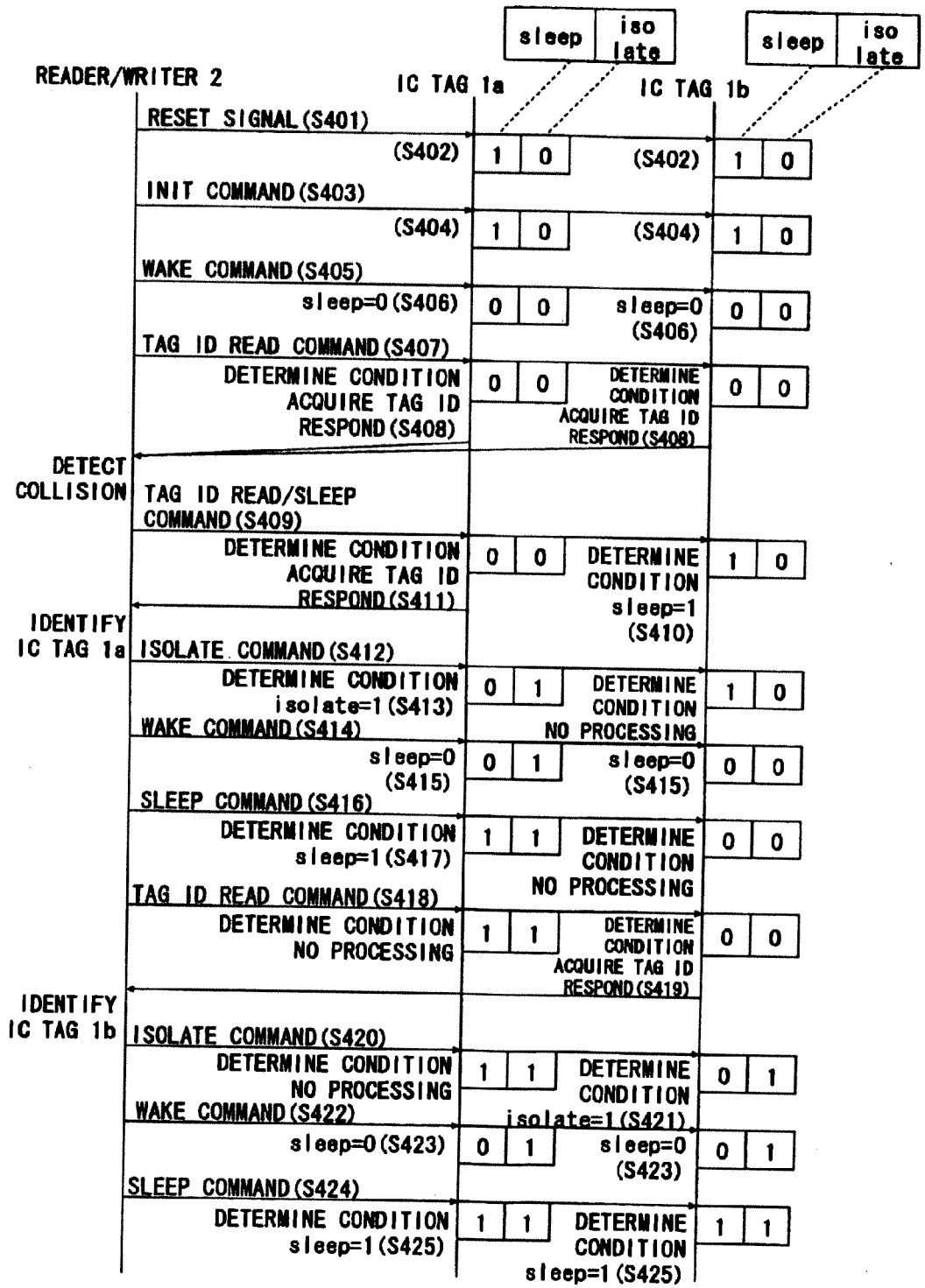
FIG. 4 is a sequence chart of the communication method of the IC tag system of the IC tag of the first embodiment.

Referring to a sequence chart of FIG. 4, a communication method of the IC tag system of this embodiment is described. FIG. 4 shows an example in which the reader/writer 2 communicates with the IC tags 1a and 1b within the communication area to sequentially identify the tag IDs of the IC tags 1a and 1b through the anti-collision.

First, the reader/writer 2 sends the reset signal to the IC tags 1a and 1b within the communication area (S401). For example, after the IC tags 1a and 1b are placed in the communication area of the reader/writer 2, the reader/writer 2 generates a signal including only the frame pulse (reference pulse) as a reset signal and sends the generated signal to the IC tag 1 so that the IC tag generates a power supply voltage and is first reset.

Next, the IC tags 1a and 1b receive a reset signal to set the sleep flag to 1 and set the isolate flag to 0 to thereby set the internal state to the SLEEP state (S402). At this time, in the IC tags 1a and 1b, the reset signal sent from the reader/writer 2 in step S401 is input to the receiving unit 12 and the power supply voltage generating unit 11 through the antenna 17, and the power supply voltage generating unit 11 generates a power supply voltage in accordance with received radio waves. Then, if the power supply voltage generated with the power supply voltage generating unit 11 is equal to or higher than an operating voltage of the semiconductor device 10, the power supply voltage generating unit 11 outputs the reset signal to the control unit 15 or other such circuits to reset the internal state.

Next, the reader/writer 2 sends the INIT command to the IC tags 1a and 1b within the communication area (S403). The INIT command is an initialize command issued prior to the anti-collision processing. For example, after the elapse of a predetermined period from step S401, the reader/writer 2 sends the INIT command to the IC tag 1. Then, when receiving the INIT command, the IC tags 1a and 1b are initialized (S404). Incidentally, in this example, the IC tag sends no response to the INIT command and the WAKE command, but the present invention is not limited thereto. Any response may be sent to these commands. The reader/writer cannot detect that IC tags exist within the communication area before starting communications. The reader/writer may detect that IC tags exist within the communication area by receiving responses to the INIT command and the WAKE command or to the tag ID read command from the IC tag.

Next, the reader/writer 2 executes an anti-collision processing for identifying the IC tag 1 from S405 forward. The anti-collision processing is a processing of sequentially identifying each of plural IC tags for communications with the plural IC tags.

First, the reader/writer 2 sends the WAKE command to the IC tags 1*a* and 1*b* (S405). Then, the IC tags 1*a* and 1*b* reset the sleep flag to 0 by means of the command execution unit 152 to cancel the SLEEP state as the internal state (S406).

Next, the reader/writer 2 sends the tag ID read command to the IC tags 1*a* and 1*b* (S407). Then, the IC tags 1*a* and 1*b* determine whether or not sleep flag=0 by means of the command analyzing unit 151 to retrieve a tag ID of the IC tag to send the tag ID to the reader/writer 2 as a response to the command (S408).

Next, the reader/writer 2 detects a collision of the received tag ID to send the tag ID read/SLEEP command to the IC tags 1*a* and 1*b* (S409). A tag ID range is stored in the data field of the command as a condition for an IC tag the internal state of which is the SLEEP state. Then, as shown in FIG. 3, the IC tags 1*a* and 1*b* determine whether or not the tag ID of the IC tag falls within a tag ID range designated by a command parameter by means of the command analyzing unit 151. Since the IC tag 1*b* is included, the command execution unit 152 sets the sleep flag to 1 to bring the tag into the SLEEP state (S410). Since the IC tag 1*a* is not included, the command execution unit 152 acquires a tag ID to send the tag ID to the reader/writer 2 as a response to the command (S411).

For example, one of the two processings executed in accordance with the tag ID read/SLEEP command is a processing not responding to the reader/writer. Thus, the reader/writer only needs to execute a processing in accordance with one response, so a complicated processing like a processing of receiving two responses at a time does not need to be added. In this example, one processing is a processing of sending back a tag ID, and the other processing is a processings of switching (shifting) the internal state of the IC tag not to send any response. Next, since there is no fear about the collision of the tag ID, the reader/writer 2 identifies a tag ID of the IC tag 1*a* to send the ISOLATE command to the IC tags 1*a* and 1*b* (S412). Then, the IC tags 1*a* and 1*b* determine whether or not sleep flag=0 by means of the command analyzing unit 151. Since sleep flag=1 for the IC tag b, the command execution unit 152 executes no processing. Since sleep flag=0 for the IC tag a, the command execution unit 152 sets the isolate flag to 1 to bring the tag into the ISOLATED state (S413).

Next, the reader/writer 2 sends the WAKE command to the IC tags 1*a* and 1*b* (S413). Then, the IC tags 1*a* and 1*b* reset the sleep flag to 0 by means of the command execution unit 152 to cancel the SLEEP state as the internal state (S415). Next, the reader/writer 2 sends the SLEEP command to the IC tags 1*a* and 1*b* (S416). As a parameter of the SLEEP command, "isolate flag=1" is set as a condition for an IC tag the internal state of which is the SLEEP state. Then, the IC tags 1*a* and 1*b* determine whether or not isolate flag=1 by means of the command analyzing unit 151. Since isolate flag=0 for the IC tag b, the command execution unit 152 executes no processing. Since isolate flag=1 for the IC tag a, the command execution unit 152 sets the sleep flag to 1 to bring the tag into the SLEEP state (S417).

Next, the reader/writer 2 sends the tag ID read command to the IC tags 1*a* and 1*b* (S418). Then, the IC tags 1*a* and 1*b* determine whether or not sleep flag=0 by means of the command analyzing unit 151. Since sleep flag=1 for the IC tag 1*a*, the command execution unit 152 executes no processing. Since sleep flag=0 for the IC tag 1*b*, the command execution unit 152 retrieves a tag ID of the IC tag to send the tag ID to the reader/writer as a response to the command (S419).

Next, since there is no fear about the collision of the tag ID, the reader/writer 2 identifies a tag ID of the IC tag 1*b* to send the ISOLATE command to the IC tags 1*a* and 1*b* (S420). Then, the IC tags 1*a* and 1*b* determine whether or not sleep flag=0 by means of the command analyzing unit 151. Since sleep flag=1 for the IC tag 1*a*, the command execution unit 152 executes no processing. Since sleep flag=0 for the IC tag 1*b*, the command execution unit 152 sets the isolate flag to 1 to bring the tag into the ISOLATED state (S421). Next, the reader/writer 2 sends the WAKE command to the IC tags 1*a* and 1*b* (S422). Then, the IC tags 1*a* and 1*b* reset the sleep flag to 0 by means of the command execution unit 152 to cancel the SLEEP state as the internal state (S423). Next, the reader/writer 2 sends the SLEEP command to the IC tags 1*a* and 1*b* (S424). As a parameter of the SLEEP command, "isolate flag=1" is set as a condition for an IC tag the internal state of which is the SLEEP state. Then, the IC tags 1*a* and 1*b* determine whether or not isolate flag=1 by means of the command analyzing unit 151. Since isolate flag=1 for the IC tags a and b, the command execution unit 152 sets the sleep flag to 1 to bring the tag into the SLEEP state (S425). Through the above steps, the anti-collision processing is completed, and a read command or write command is sent to the IC tags 1*a* and 1*b* to write/read data to/from a memory of the IC tags 1*a* and 1*b*.

As described above, in this embodiment, the IC tag that receives a predetermined command executes different processings between the case where the internal state matches the command condition and the case where the internal state does not match the command condition. Hence, it is possible to reduce a communication sequence and shorten a period necessary for communications between the IC tag and the reader/writer or a period necessary for executing the command. For example, as a result of comparing the sequence of the Related Art with that of this embodiment, steps S90 to S912 of FIG. 11 correspond to steps S409 to S411 of FIG. 4; in the sequence of the Related Art, the SLEEP command and the tag ID read command are sent in two steps, while in this embodiment, the number of times the command is transmitted can be reduced to 1 by use of the tag ID read/SLEEP command.

In particular, the tag ID read processing or SLEEP processing can be carried out in accordance with one command, making it possible to shorten a period for the anti-collision processing. In the IC tag system, if plural IC tags exist, the IC tags should be identified. Thus, the identification (anti-collision processing) takes also much time to execute. A period necessary for the identification increases in proportion to the number of IC tags. Accordingly, shortening the anti-collision processing makes it possible to efficiency shorten the entire communication processing in the case where many IC tags exist.

Second Embodiment

Next, an IC tag system according to a second embodiment of the present invention is described. In this embodiment, the IC tag determines an execution condition in response to a command different from that of the first embodiment to thereby execute a different operation. In this embodiment, if the execution condition is met, an ISOLATE processing for setting the internal state as an ISOLATED state is executed. If the execution condition is not met, a processing for setting the internal state to a WAKE state is executed.

Components of the IC tag system or IC tag of this embodiment are the same as those of FIGS. 1 and 2, and thus description thereof is omitted here. In this embodiment, an ISOLATE/WAKE command is analyzed/executed aside from the commands of the first embodiment. The ISOLATE/WAKE command is a command to instruct the IC tag to execute an ISOLATE processing for switching a current internal state to an ISOLATED state or a processing for canceling a SLEEP state as the internal state. For example, the ISOLATE/WAKE command is sent from the reader/writer based on a format of FIG. 8. Then, an identifier of the ISOLATE/WAKE command is set in the command ID field, and a tag ID of the IC tag the internal state of which is the ISOLATED state is set in the data field.

Figure 5:
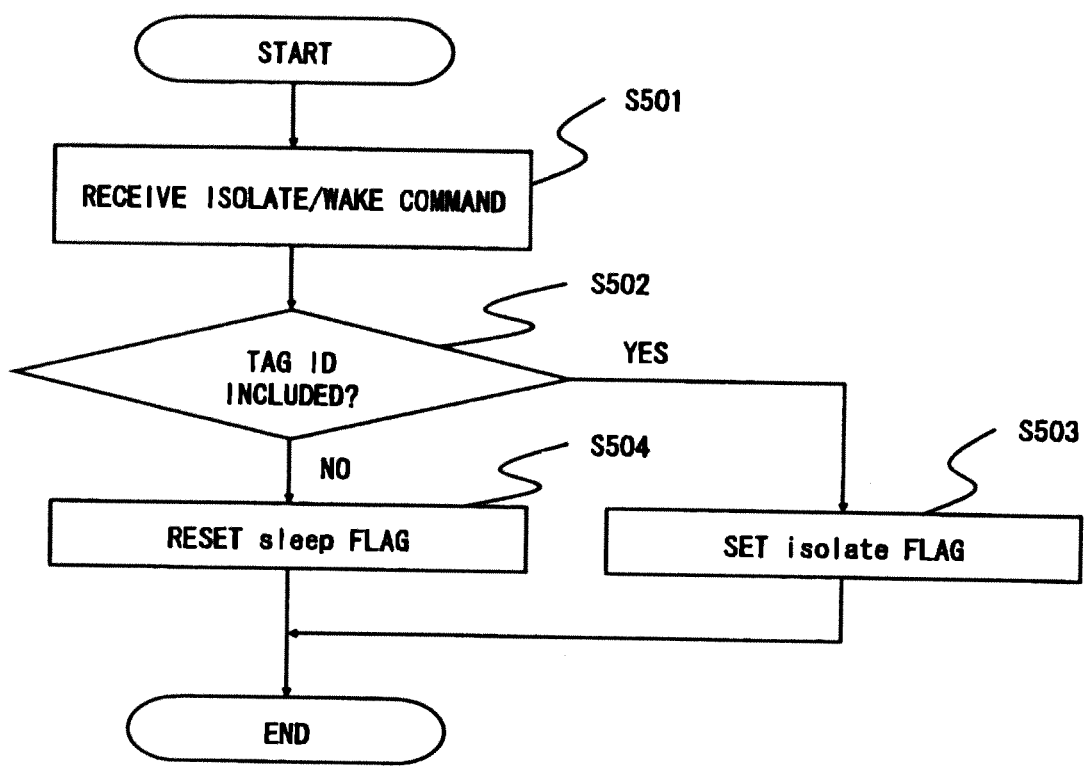
FIG. 5 is a flowchart of a command execution processing of the IC tag according to a second embodiment of the present invention.

A flowchart of FIG. 5 shows a processing of the IC tag of this embodiment in the case where the IC tag receives the ISOLATE/WAKE command.

First, the command analyzing unit 151 analyzes the received command data to detect that the received command is the ISOLATE/WAKE command based on a command ID of the command ID field (S501).

Next, the command analyzing unit 151 compares a tag ID range as a parameter in the data field with a tag ID stored in the storage unit 16 to determine whether or not the tag ID of the IC tag falls within the tag ID range designated by the command (S502).

In step S502, if the determination result shows that the tag ID is included, the command execution unit 152 sets the isolate flag to 1 to bring the tag into the ISOLATED state (S503). Further, in step S502, if the determination result shows that the tag ID is not included, the command execution unit 152 resets the sleep flag to 0 to cancel the SLEEP state (S504).

Figure 6:
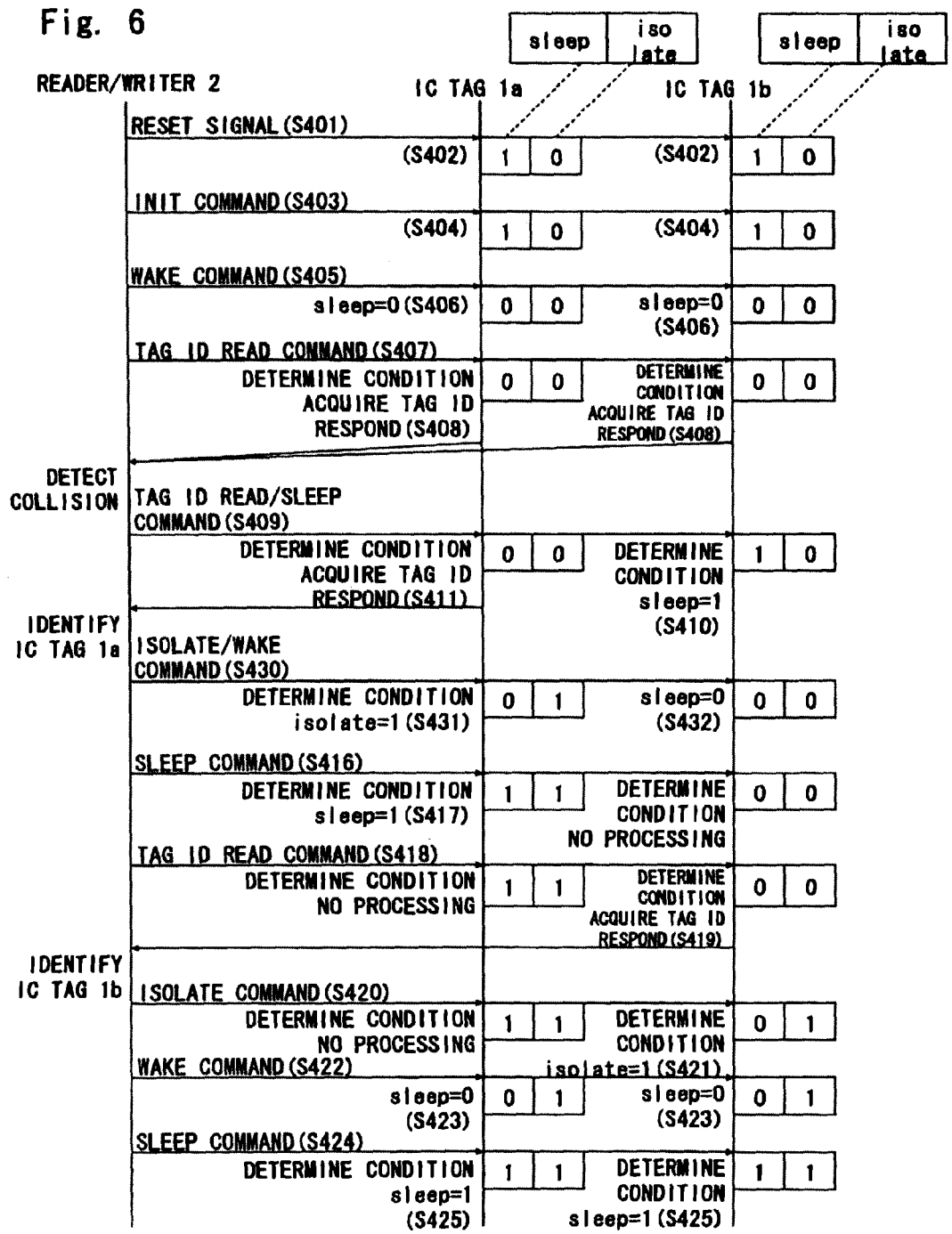
FIG. 6 is a sequence chart of the communication method of the IC tag system of the second embodiment.

Referring next to a sequence chart of FIG. 6, a communication method of the IC tag system of this embodiment is described. FIG. 6 shows an example of sequentially identifying the tag IDs of the IC tags 1a and 1b through the anti-collision similar to the example of FIG. 4. The example of FIG. 6 is different from FIG. 4 in that steps S412 to S415 are replaced by steps S430 to S432.

First, in steps S401 to S404, processings of a reset signal and an INIT command are carried out. From step S405 onward, the anti-collision processing is performed. In the anti-collision processing, the collision of the tag ID is avoided to identify a tag ID of the IC tag 1a in accordance with the WAKE command (S405), the tag ID read command (S407), and the tag ID read/SLEEP command (S409).

Next, the reader/writer 2 sends the ISOLATE/WAKE command to the IC tags 1a and 1b (S430). Then, as shown in FIG. 5, the IC tags 1a and 1b determine whether or not the tag ID of the IC tag falls within a tag ID range designated by a command parameter by means of the command analyzing unit 151. Since the IC tag 1a is included, the command execution unit 152 sets the isolate flag to 1 to bring the tag into the ISOLATED state (S431). Since the IC tag 1b is not included, the command execution unit 152 resets the sleep flag to 0 to cancel the SLEEP state (S432). In this example, both of the processings executed in accordance with the ISOLATE/WAKE command are processings of switching the internal state of the IC tag not to send a response.

Next, the IC tag 1b is identified in accordance with the SLEEP command (S416) and the tag ID read command (S418). The IC tag 1b is put into the ISOLATED state in accordance with the ISOLATE command (S420) (S421). Further, the IC tags 1a and 1b are put into the SLEEP state (S425) in accordance with the WAKE command (S422) and the SLEEP command (S424).

As described above, in this embodiment, it is possible to further reduce a communication sequence and shorten a period necessary for communications between the IC tag and the reader/writer or a period necessary for executing the command by use of the ISOLATE/WAKE command in addition to the tag ID/read command of the first embodiment. For example, as a result of comparing a sequence of the Related Art with that of this embodiment, steps S913 to S916 of FIG. 11 correspond to steps S430 to S432 of FIG. 6; in the sequence of the Related Art, the ISOLATE command and the WAKE command are sent in two steps, while in this embodiment, the number of times the command is transmitted can be reduced to 1 by use of the ISOLATE/WAKE command. As a result, it is possible to further shorten the anti-collision processing.

Third Embodiment

Next, an IC tag system according to a third embodiment of the present invention is described. In this embodiment, if plural IC tags are additionally provided, the IC tag executes different operations through the determination of the execution condition. In this embodiment, if the execution condition is met, a write processing of writing data to a memory of the IC tag is carried out. On the other hand, if the execution condition is not met, a tag ID read processing of reading a tag ID of the IC tag is carried out.

The IC tag system of this embodiment includes three IC tags 1a, 1b, and 1c. The other components of the IC tag system and IC tag are the same as those of FIGS. 1 and 2, and thus description thereof is omitted here.

Figure 7:
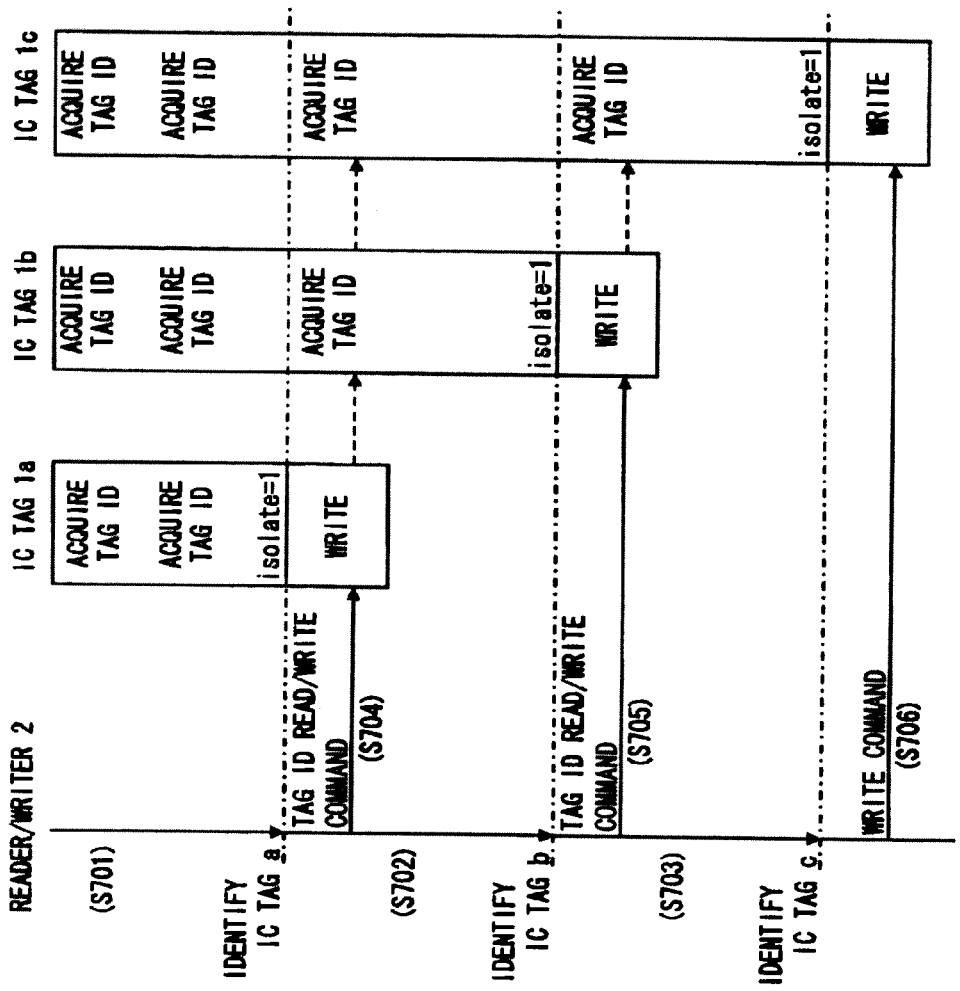
FIG. 7 is a flowchart of a communication method of an IC tag system according to a third embodiment of the present invention.

Referring to FIG. 7, a communication method of the IC tag system of this embodiment is described. FIG. 7 shows an example in which the reader/writer 2 communicates with the IC tags 1a, 1b, and 1c within the communication area to identify tag IDs of the IC tags 1a, 1b, and 1c through the anti-collision and execute a write processing.

In FIG. 7, steps S701, S702, and S703 are anti-collision processing steps of identifying the IC tags 1a, 1b, and 1c, respectively. A detailed processing thereof is similar to that of FIGS. 4 and 6.

In step S701, if a tag ID of the IC tag 1a is identified, the IC tag 1a is put into the ISOLATED state. Subsequently, in step S702, the anti-collision processing is performed. At this time, the reader/writer 2 sends a tag ID read/write command to the IC tags 1a, 1b, and 1c (S704). Then, the IC tags 1a, 1b, and 1c determined whether or not the tag IDs thereof match a tag ID designated by a command parameter. Since the tag ID of the IC tag 1a is matched, the IC tag 1a executes the write processing to send a message that the command execution is completed back to the reader/writer 2. On the other hand, the tag IDs of the IC tags 1b and 1c are mismatched, the IC tags 1b and 1c retrieve the tag IDs and sends the IDs back to the reader/writer 2. Two processings executed in response to tag ID read/write command are processings of responding to the reader/writer at different timings. When the IC tag executes the write processing and the read processing period, a period necessary for the write processing is different from that for the read processing, so a response to the reader/writer is issued at different timings. Therefore, the reader/writer can receive both of the response regarding the write processing and the response regarding the read processing. In step S703 as well, the reader/writer 2 sends the tag ID read/write command to the IC tags 1b and 1c (S705), the IC tag 1b executes the write processing, and the IC tag 1c executes the tag ID read processing. After step S703, the write command is sent to the IC tag 1c (S706), and data is written to the IC tag 1c.

As described above, in this embodiment, the tag ID read processing and the data write processing can be executed in accordance with one command by use of the tag ID read/write command. Hence, the anti-collision processing and the write processing can be carried out at the same time in parallel. Thus, it is possible to further reduce a communication sequence and shorten a period necessary for communications between the IC tag and the reader/writer or a period necessary for executing the command.

Incidentally, the two processings executed in response to one command are not limited to the above processings, and may be other processings. For example, the one command may be a command that combines the WAKE command in step S422 of FIG. 4 and the SLEEP command in step S424 for the IC tag (isolate flag=1). In addition, in the above embodiments, two different processings are executed in response to one command, but desired processings may be selected from three or more command processings and executed. For example, the data write processing, the tag ID read processing, and the sleep flag setting processing may be executed in accordance with one command.

Furthermore, the above embodiments describe the passive-type IC tag including no power supply, but the present invention is not limited thereto. An active-type IC tag including the power supply may be used instead.

It is apparent that the present invention is not limited to the above embodiment that may be modified and changed without departing from the scope and spirit of the invention.

What is claimed is:

1. A method of identifying tags in a communication area through an anti-collision by a reader/writer, the tags including a first and second tags in the communication area, the first tag including a first memory storing a first tag ID, a first sleep flag, and a first isolate flag, the second tag including a second memory storing a second tag ID, a second sleep flag and a second isolate flag, the first tag ID being different from the second tag ID, the method comprising:

transmitting a RESET command from the reader/writer;
setting, in response to the RESET command, a first value to the first isolate flag, the first value of the first isolate flag being indicating that the first tag is not identified by the reader/writer;
setting, in response to the RESET command, a second value to the second isolate flag, the first value of the second isolate flag being indicating that the second tag is not identified by the reader/writer;
transmitting a first WAKE command from the reader/writer;
setting, in response to the first WAKE command, a first value to the first sleep flag, the first value of the first sleep flag being indicative of a permission of a transmission of the first tag ID;
setting, in response to the first WAKE command, a first value to the second sleep flag, the first value of the second sleep flag being indicative of a permission of a transmission of the second tag ID;
transmitting a first tag ID read command from the reader/writer after the setting of the first value to the first isolate flag, the setting of the first value to the second isolate flag, the setting of the first value to the first sleep flag and the setting of the first value to the second sleep flag;
transmitting, in response to the first tag ID read command, the first tag ID from the first tag and the second tag ID from the second tag;
detecting a collision of the received first and second tag IDs to transmit a first SLEEP command from the reader/writer, the first SLEEP command including a first tag ID range as a condition, the first tag ID range including the second tag ID but not including the first tag ID;
receiving the first SLEEP command at the second tag to set a second value to the second sleep flag, the second value of the second sleep flag being indicative of a prohibition of the transmission of the second tag ID;
transmitting a second tag ID read command from the reader/writer after the receiving the first SLEEP command at the second tag;
receiving the second tag ID read command at the first tag to transmit the first tag ID from the first tag;
receiving, at the reader/writer, the first tag ID transmitted corresponding to the second tag ID read command to identify the first tag in the communication area;
transmitting an ISOLATE/WAKE command from the reader/writer after the receiving of the first tag ID transmitted corresponding to the second tag ID read command;
setting, in response to the ISOLATE/WAKE command, a second value to the first isolate flag, the second value of the first isolate flag being indicating that the first tag is identified by the reader/writer; and
setting, in response to the ISOLATE/WAKE command, the first value to the second sleep flag.

2. The method according to claim 1, further comprising:
transmitting a second SLEEP command from the reader/writer after the setting of the second value to the first isolate flag and the setting of the first value to the second sleep flag in response to the ISOLATE/WAKE command, the SLEEP command including a condition that each of the first and second isolate flags is equal to the second value;
setting, in response to the second SLEEP command, a second value to the first sleep flag, the second value of the first sleep flag being indicative of a prohibition of the transmission of the first tag ID;
transmitting a third tag ID read command from the reader/writer after the setting of the second value to the first sleep flag in response to the second SLEEP command;
transmitting, in response to the third tag ID read command, the second tag ID from the second tag; and
receiving, at the reader/writer, the second tag ID transmitted corresponding to the third tag ID read command to identify the second tag in the communication area.

3. The method according to claim 2, further comprising:
transmitting an ISOLATE command from the reader/writer after the receiving of the second tag ID transmitted corresponding to the third tag ID read command; and
setting, in response to the ISOLATE command, a second value to the second isolate flag, the second value of the second isolate flag being indicating that the second tag is identified by the reader/writer.

4. The method according to claim 1, further comprising:
transmitting a tag ID read/write command from the reader/writer after the setting of the second value to the first isolate flag and the setting of the first value to the second sleep flag in response to the ISOLATE/WAKE command, the tag ID read/write command including a second tag ID range as a condition, the second tag ID range including the first tag ID but not including the second tag ID;
executing, in response to the tag ID read/write command, a write processing at the first tag to transmit a message indicating that the write processing is completed from the first tag;
transmitting, in response to the tag ID read/write command, the second tag ID from the second tag; and receiving, at the reader/writer, the second tag ID transmitted corresponding to the tag ID read/write command to identify the second tag in the communication area.

5. The method according to claim 4,
wherein a timing of the transmitting of the message from the first tag is different from a timing of the transmitting of the second tag ID from the second tag.

6. The method according to claim 1,
wherein the first and second sleep flags are indicative of communication states of the first and second tags,
wherein the communication state of the first tag is not changed in response to the first SLEEP command from the reader/writer, and
wherein the communication state of the second tag is changed in response to the first SLEEP command from the reader/writer.

7. The method according to claim 2,
wherein the first and second sleep flags are indicative of communication states of the first and second tags,
wherein the communication state of the first tag is changed in response to the second SLEEP command from the reader/writer, and
wherein the communication state of the second tag is not changed in response to the second SLEEP command from the reader/writer.

* * * * *